(12) United States Patent
Diao et al.

(10) Patent No.: US 9,600,784 B2
(45) Date of Patent: Mar. 21, 2017

(54) ESTIMATING VALUE OF INFORMATION TECHNOLOGY SERVICE MANAGEMENT BASED ON PROCESS COMPLEXITY ANALYSIS

(75) Inventors: Yixin Diao, Scarsdale, NY (US); Kamal Kumar Bhattacharya, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 12/062,853

(22) Filed: Apr. 4, 2008

(65) Prior Publication Data
US 2009/0254492 A1 Oct. 8, 2009

(51) Int. Cl.
G06Q 10/06 (2012.01)
G06Q 30/02 (2012.01)

(52) U.S. Cl.
CPC ......... *G06Q 10/06* (2013.01); *G06Q 30/0283* (2013.01)

(58) Field of Classification Search
CPC ...................................................... G06Q 10/00
USPC ........................................................... 705/11
See application file for complete search history.

(56) References Cited

U.S. PATENT DOCUMENTS

| | | | |
|---|---|---|---|
| 5,745,880 A | 4/1998 | Strothmann | |
| 5,765,138 A | 6/1998 | Aycock et al. | |
| 5,793,632 A | 8/1998 | Fad et al. | |
| 5,907,488 A | 5/1999 | Arimoto et al. | |
| 5,960,417 A | 9/1999 | Pan et al. | |
| 6,263,020 B1 | 7/2001 | Gardos et al. | |
| 6,438,594 B1 | 8/2002 | Bowman-Amuah | |
| 6,453,269 B1 | 9/2002 | Quernemoen | |
| 6,467,080 B1 | 10/2002 | Devine et al. | |
| 6,526,387 B1 | 2/2003 | Ruffin et al. | |
| 6,526,392 B1 * | 2/2003 | Dietrich et al. | 705/400 |
| 6,651,244 B1 | 11/2003 | Smith et al. | |
| 6,675,149 B1 | 1/2004 | Ruffin et al. | |
| 6,681,230 B1 | 1/2004 | Blott et al. | |
| 6,715,130 B1 | 3/2004 | Eiche et al. | |

(Continued)

OTHER PUBLICATIONS

Yixin Diao and Alexander Keller, "Quantifying the Complexity of IT Service Management Processes", IFIP International Federation for Information Processing, 2006, pp. 61-73, 2006.*
C. Tian et al., "Business Value Analysis of IT Services," 2007 IEEE International Conference on Services Computing (SCC 2007), 8 pages.

(Continued)

*Primary Examiner* — Thomas L Mansfield, Jr.
(74) *Attorney, Agent, or Firm* — Louis J. Percello; Ryan, Mason & Lewis, LLP

(57) ABSTRACT

Techniques are disclosed for quantitatively estimating a value of a given process, such as an IT service management process. For example, a computer-implemented method for estimating a value based on a complexity analysis of a given process comprises a computer performing the following steps. A context for the given process is identified. A baseline for the given process is quantified. The process baseline comprises a key performance indicator and an underlying complexity measure. An improvement measure for the given process is determined. The improvement measure is achieved by at least one of a tooling deployment or a process transformation. A value derived for the given process is estimated based on the context identifying, baseline quantifying, and improvement determining steps.

17 Claims, 8 Drawing Sheets

(56) References Cited

U.S. PATENT DOCUMENTS

| | | | |
|---|---|---|---|
| 6,922,684 | B1 | 7/2005 | Aldridge et al. |
| 6,970,803 | B1 | 11/2005 | Aerdts et al. |
| 7,039,606 | B2 | 5/2006 | Hoffman et al. |
| 7,177,774 | B1 | 2/2007 | Brown et al. |
| 7,379,923 | B2* | 5/2008 | Burchfield et al. ............ 705/400 |
| 7,728,870 | B2 | 6/2010 | Rudnik et al. |
| 7,904,320 | B1* | 3/2011 | Adams et al. ................ 705/7.11 |
| 8,200,527 | B1* | 6/2012 | Thompson et al. .......... 705/7.39 |
| 2002/0143606 | A1 | 10/2002 | Atefi et al. |
| 2002/0169649 | A1 | 11/2002 | Lineberry et al. |
| 2003/0088456 | A1 | 5/2003 | Ernest et al. |
| 2003/0187719 | A1 | 10/2003 | Brocklebank |
| 2004/0024627 | A1 | 2/2004 | Keener |
| 2004/0068431 | A1 | 4/2004 | Smith et al. |
| 2004/0186757 | A1 | 9/2004 | Starkey |
| 2004/0186817 | A1 | 9/2004 | Thames et al. |
| 2004/0199417 | A1 | 10/2004 | Baxter et al. |
| 2004/0236805 | A1 | 11/2004 | Gordon |
| 2005/0137950 | A1* | 6/2005 | Palozzi et al. ................... 705/35 |
| 2005/0203917 | A1 | 9/2005 | Freeberg et al. |
| 2006/0069607 | A1 | 3/2006 | Linder |
| 2006/0184410 | A1* | 8/2006 | Ramamurthy et al. ........... 705/8 |
| 2007/0038465 | A1 | 2/2007 | Jang et al. |
| 2007/0043524 | A1 | 2/2007 | Brown et al. |
| 2007/0043525 | A1 | 2/2007 | Brown et al. |
| 2007/0136016 | A1* | 6/2007 | Brown et al. ................... 702/81 |
| 2007/0240131 | A1 | 10/2007 | Sumerlin |
| 2007/0282644 | A1 | 12/2007 | Diao et al. |
| 2007/0282645 | A1 | 12/2007 | Brown et al. |
| 2007/0282876 | A1 | 12/2007 | Diao et al. |
| 2008/0215404 | A1 | 9/2008 | Diao et al. |
| 2009/0033807 | A1 | 2/2009 | Sheng et al. |
| 2009/0254492 | A1 | 10/2009 | Diao et al. |

OTHER PUBLICATIONS

H.W. Desurvire, "Faster, Cheaper!! Are Usability Inspection Methods as Effective as Empirical Testing?", Usability Inspection Methods, J. Nielsen & R.L. Mack (eds.),1994, pp. 173-202, John Wiley & Sons, Inc., New York, NY, USA, available at http://www.behavioristics.com/downloads/usabilityinspectionmethods.pdf.

P. McInerney & F. Maurer, "UCD in Agile Projects: Dream Team or Odd Couple?", Interactions, Nov.-Dec. 2005, pp. 19-23, vol. 12, No. 6, ACM, New York, NY, USA.

J. Nielsen, "Guerilla HCI: Using Discount Usability Engineering to Penetrate the Intimidation Barrier", Cost-Justifying Usability, R.G. Bias & D.J. Mayhew (eds.), 1994, pp. 242-272, Academic Press, Inc., Orlando, FL, USA, available at http://www.useit.com/papers/guerilla-hci.html.

C. Tian et al., "Business Value Analysis of IT Services", Proceedings of the IEEE International Conference on Services Computing (SCC 2007), Jul. 2007, pp. 308-315, Salt Lake City, Utah, USA.

A.B. Brown et al., "Experience with Evaluating Human-Assisted Recovery Processes", Proceedings of the IEEE International Conference on Dependable Systems and Networks, Jun.-Jul. 2004, pp. 405-410, IEEE Computer Society, Washington, DC, USA.

A.B. Brown et al., "A Model of Configuration Complexity and its Application to a Change Management System", Proceedings of the 9th Annual IFIP/IEEE International Conference on Integrated Network Management (IM 2005), May 2005, pp. 631-644.

A. Schroeder, "Integrated Program Measurement and Documentation Tools", Proceedings of the 7th International Conference on Software Engineering, 1984, pp. 304-313, IEEE Press, Piscataway, NJ, USA.

K. Beck et al., "Principles behind the Agile Manifesto", 2001, http://agilemanifesto.org/principles.html, 2 pages.

K. Beck et al., "Manifesto for Agile Software Development", 2001, http://agilemanifesto.org, 1 page.

* cited by examiner

| FIG. 4A |
| FIG. 4B |
| FIG. 4C |

| | TASK | BASELINE |
|---|---|---|
| 1 | PERFORM PRELIMINARY ASSESSMENT | 10 |
| 2 | IDENTIFY LEVEL OF ASSESSMENT | 5 |
| 3 | MAKE RFCs AVAILABLE FOR ASSESSMENT | 5 |
| 4 | ASSESS FOR NON-TECHNICAL IMPACT | 35 |
| 5 | ASSESS FOR TECHNICAL IMPACT | 35 |
| 6 | COLLECT CHANGE ASSESSMENT RESULTS AND ISSUES | 10 |
| | | 100% |

FROM FIG. 4A 

TO FIG. 4C 

| | QUESTION | BASELINE |
|---|---|---|
| 1 | WHAT IS THE SERVICE(S) IMPACTED BY THIS CHANGE? | 5 |
| 2 | WHAT IS THE RISK OF THE SERVICE NOT BEING AVAILABLE? | 6 |
| 3 | WHAT ARE THE PREDEFINED CHANGE WINDOWS FOR SERVICE CHANGES? | 3 |
| 4 | IS THERE AN SLA FOR THE SERVICE? | 3 |
| 5 | ARE THERE PENALTIES FOR NOT ACHIEVING THE SLA? | 3 |
| 6 | HAVE THE SUPPORT PERSONNEL BEEN COMMUNICATED TO AND DO THEY KNOW WHAT TO DO IN THE EVENT OF A PROBLEM WITH THE CHANGE? | 5 |
| | | 25 |

FIG. 4B

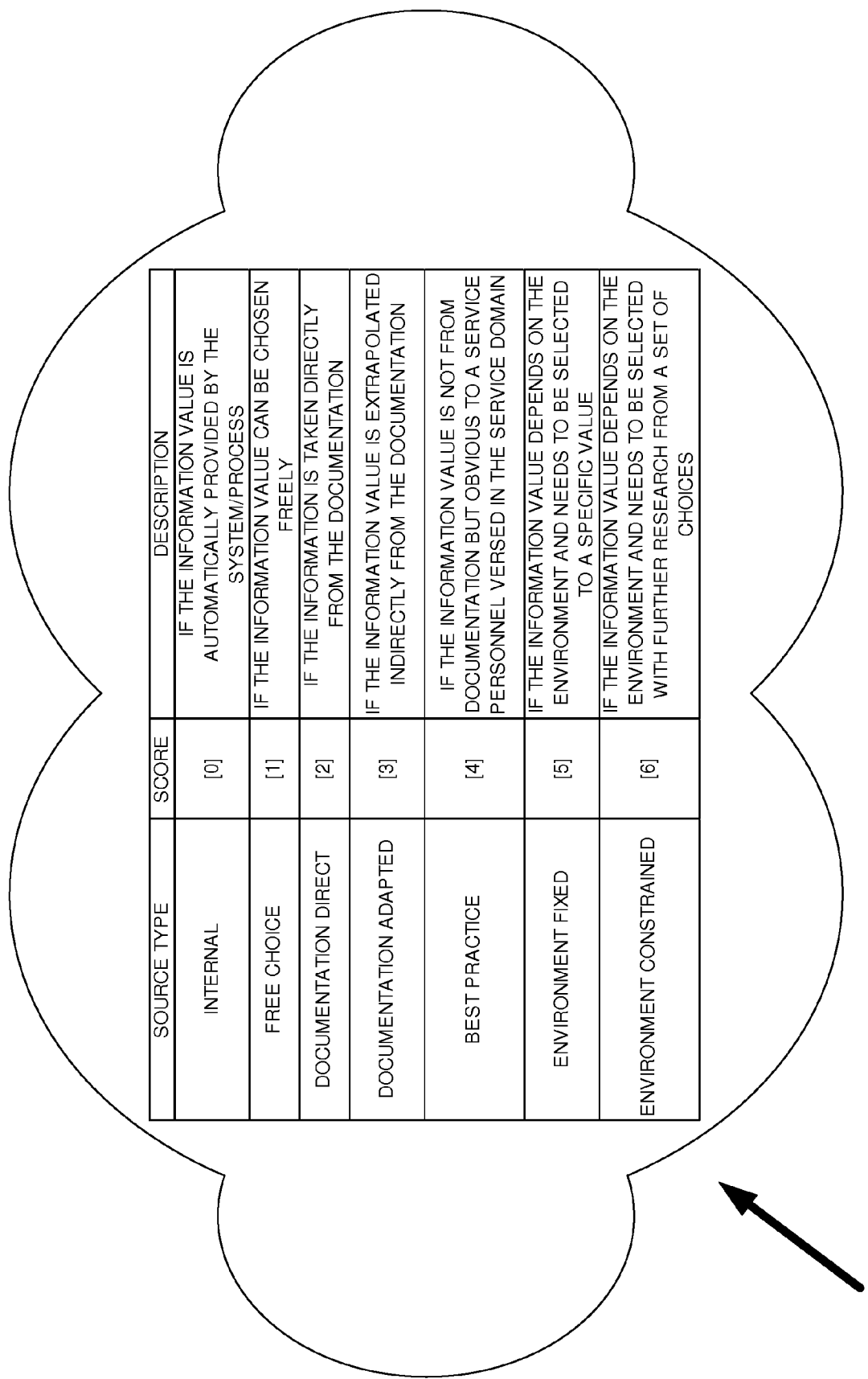

FIG. 4C

FROM FIG. 4B

| SOURCE TYPE | SCORE | DESCRIPTION |
|---|---|---|
| INTERNAL | [0] | IF THE INFORMATION VALUE IS AUTOMATICALLY PROVIDED BY THE SYSTEM/PROCESS |
| FREE CHOICE | [1] | IF THE INFORMATION VALUE CAN BE CHOSEN FREELY |
| DOCUMENTATION DIRECT | [2] | IF THE INFORMATION IS TAKEN DIRECTLY FROM THE DOCUMENTATION |
| DOCUMENTATION ADAPTED | [3] | IF THE INFORMATION VALUE IS EXTRAPOLATED INDIRECTLY FROM THE DOCUMENTATION |
| BEST PRACTICE | [4] | IF THE INFORMATION VALUE IS NOT FROM DOCUMENTATION BUT OBVIOUS TO A SERVICE PERSONNEL VERSED IN THE SERVICE DOMAIN |
| ENVIRONMENT FIXED | [5] | IF THE INFORMATION VALUE DEPENDS ON THE ENVIRONMENT AND NEEDS TO BE SELECTED TO A SPECIFIC VALUE |
| ENVIRONMENT CONSTRAINED | [6] | IF THE INFORMATION VALUE DEPENDS ON THE ENVIRONMENT AND NEEDS TO BE SELECTED WITH FURTHER RESEARCH FROM A SET OF CHOICES |

ESTIMATING VALUE OF INFORMATION TECHNOLOGY SERVICE MANAGEMENT BASED ON PROCESS COMPLEXITY ANALYSIS

FIELD OF THE INVENTION

The present invention relates generally to computing system evaluation and, more particularly, to techniques for quantitatively estimating value of information technology service management.

BACKGROUND OF THE INVENTION

Operational costs for managing Information Technology (IT) over the last decade have been constantly increasing despite a significant decrease in infrastructure cost. The root cause of operation inefficiencies are often attributed to the complexity of IT infrastructure. Any enterprise of today maintains a large application portfolio, often grown historically, with many redundancies and decreasing visibility into the degree of interconnections between applications and hardware components.

The promise of Information Technology Service Management (ITSM) is to reduce the complexity of managing IT infrastructure by engaging a process-centric approach that allows for operational innovation and horizontal integration of the aforementioned vertical hierarchies.

However, one of the most challenging tasks in IT Service Management is to estimate the user (e.g., company or customer) impact and expectations for investments made to improve operational efficiency. There are several factors contributing to this problem.

First, each IT service in an IT organization is part of a larger value network. As today's IT service providers have very little visibility into their entire value network, it is hard to gauge the respective impact of singular process improvements.

Second, there is a lack of understanding on how to analyze the scope within which investments should be made. The service providers typically buy an enriched software package that most likely captures a much broader range of capabilities than actually required to improve the user problems. This large capability set blurs the impact horizon and makes it difficult to identify the key value to the user.

SUMMARY OF THE INVENTION

Principles of the invention provide techniques for quantitatively estimating a value of a given process, such as an IT service management process.

In one illustrative embodiment, a computer-implemented method for estimating a value based on a complexity analysis of a given process comprises a computer performing the following steps. A context for the given process is identified. A baseline for the given process is quantified. The process baseline comprises a key performance indicator and an underlying complexity measure. An improvement measure for the given process is determined. The improvement measure is achieved by at least one of a tooling deployment or a process transformation. A value derived for the given process is estimated based on the context identifying, baseline quantifying, and improvement determining steps.

Advantageously, through performance and results of these automated steps under control of a computer system, an enterprise is able to gauge the respective impact of singular process improvements, and to identify the key value to the user.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

While principles of the present invention will be described herein in the context of a practical, real-world application such as IT service management in an enterprise such as a company or other entity, the invention is not so limited. For example, principles of the invention can be applied to other management applications such as estimating the value of service process improvement, organization transformation, and investment in product improvement. It is to be understood that the term "non-technical" is used illustratively herein to refer to operational issues that may affect an enterprise, as compared with technical issues.

Accordingly, exemplary embodiments of the invention are described herein and generally include system or methods for estimating value of IT service management through quantitative complexity analysis of the underlying IT management processes.

Figure 1:
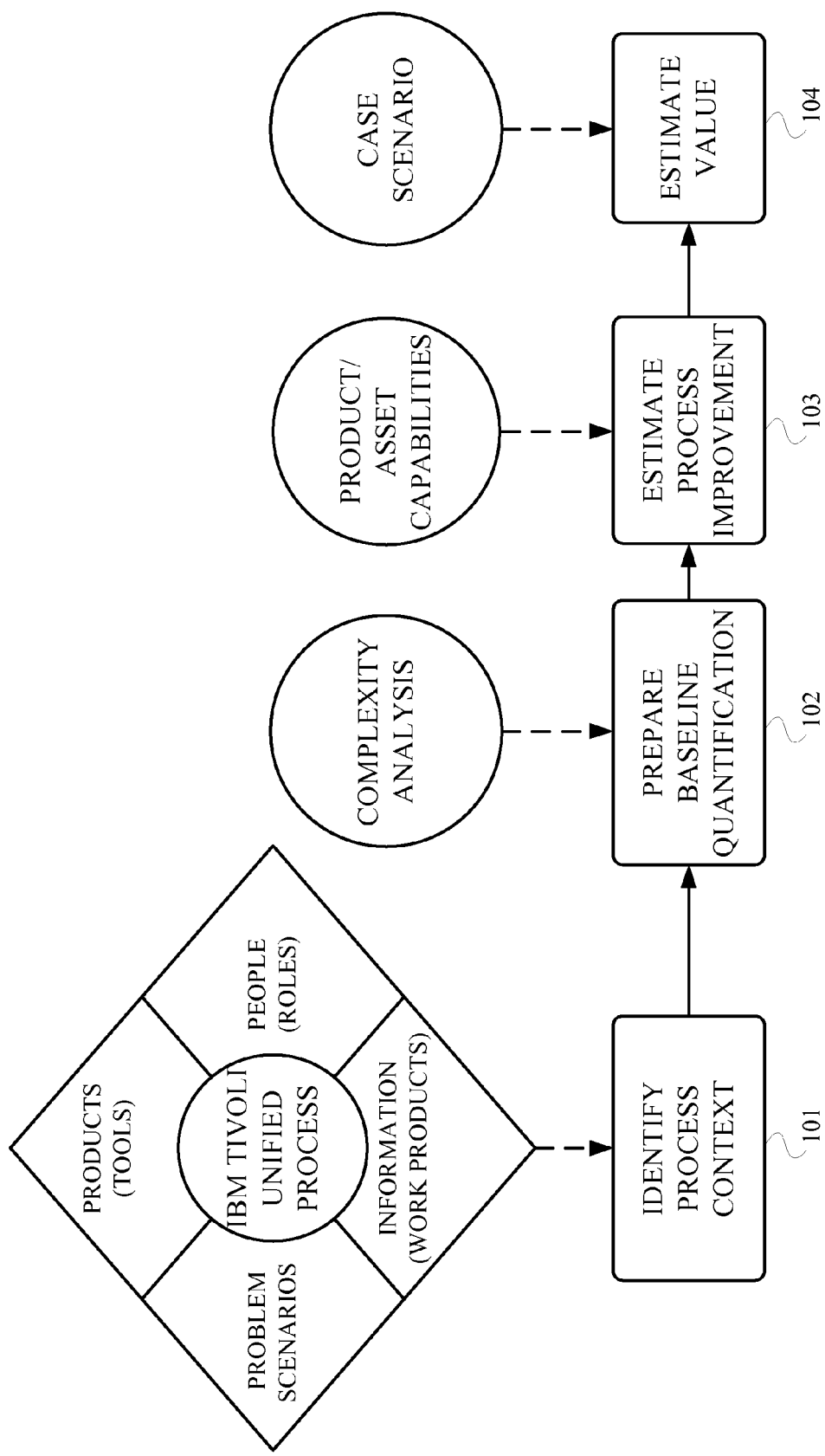
FIG. 1 is a block diagram illustrating the overall architecture for value estimation, according to an embodiment of the invention.

FIG. 1 is a block diagram illustrating an overall architecture for value estimation. As depicted in FIG. 1, the first step (101) in our value estimation methodology is to identify the process context under which the target IT service management product is evaluated. In this illustrative embodiment, we follow an Information Technology Infrastructure Library (ITIL) defined strategy which covers the whole spectrum of IT service management. More specifically, we use IBM Tivoli Unified Processes framework (ITUP), see "IBM Tivoli Unified Process (ITUP): Connecting the Dots," Enterprise Management Associates, 2006, the disclosure of which is incorporated by reference herein, as a context to identify the service management processes that the target service product is likely to impact. As is well known, ITUP is a freely available process framework that specifies ITIL processes to a greater level of detail. This process framework decomposes different service management areas into a set of (interconnected) processes and provides a work breakdown structure for each process.

Next, the methodology prepares the baseline quantification (102). In an illustrative embodiment, we use the process complexity analysis techniques introduced in Y. Diao and A. Keller, "Quantifying the Complexity of IT Service Management Processes," in Proceedings of the 17th IFIP/IEEE International Workshop on Distributed Systems: Operations and Management (DSOM 2006), Dublin, Ireland, October 2006, pp. 61-73, the disclosure of which is incorporated by reference herein, as a basic method. This process complexity analysis framework defines process complexity along several dimensions including execution, coordination, and information. Execution Complexity refers to the complexity involved in performing the tasks that make up the service process, typically characterized by the number of tasks, the number of roles involved in a task, and their degree of automation. Coordination Complexity represents the complexity resulting from coordinating between multiple roles, either within a task or between tasks, and depends on how non-technical items are transferred and processed. Information Complexity addresses the complexity involved in providing data (information) into the service process, and is quantified through how the values are obtained.

However, we explore the hierarchical process structure defined in ITUP, and interlace complexity analysis with execution time estimation so that we do not need to evaluate all tasks in the service process. That is, we focus value study on the tasks that take a significant amount of time, and only conduct deep-dive complexity analysis for those tasks for understanding them in more details. Focusing on key aspects of the process reduces the overall time for baseline quantification, and we are still able to roll up the process-wide quantification through the hierarchical process structure.

The third step (103) in our value estimation methodology is to estimate process improvement due to the introduction of new service product. In an illustrative embodiment, we can use the regression model developed in Y. Diao and A. Keller, "Predicting Labor Cost through IT Management Complexity Metrics," in Proceedings of the 10th IFIP/IEEE International Symposium on Integrated Management (IM 2007)), Munich, Germany, May 2007, the disclosure of which is incorporated by reference herein, to correlate labor time with complexity metrics. This reference disclosed the use of quantitative modeling techniques that relate the collected complexity metrics to key business-level performance metrics (such as labor time) through linear regression models. The method for constructing the quantitative model further comprises algorithms for selecting a subset of the complexity metrics to use as explanatory variables in the regression model. However, this requires a large set of time measurement data, which are typically difficult to get in practice. Instead, we propose a simplified model (to be described in detail below) that directly gives process improvement estimation based on the complexity reduction for getting the source of information.

Finally, the methodology derives value estimation (104) that is based on various cases such as labor cost reduction, service fulfillment savings, and service quality improvement.

Figure 2:
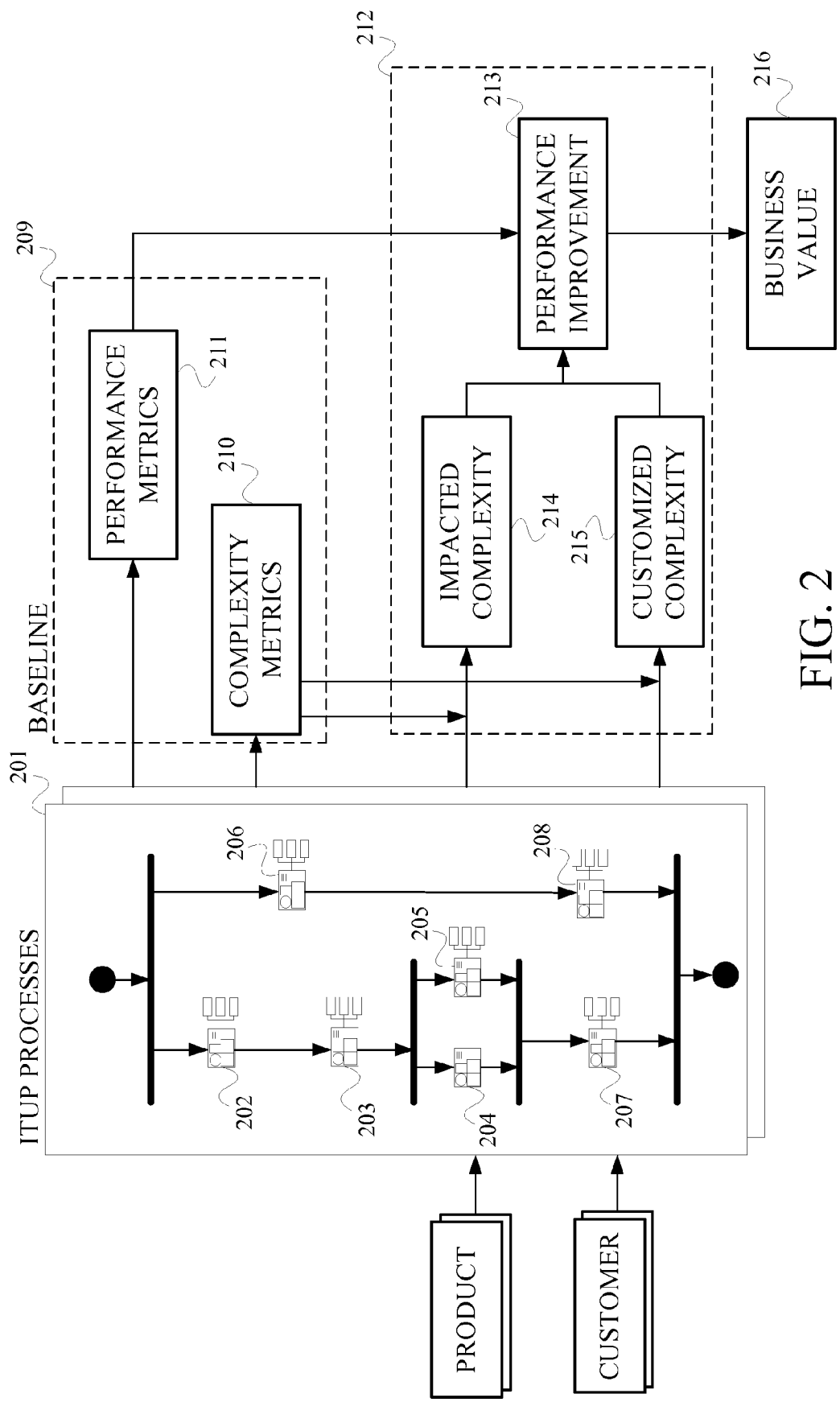
FIG. 2 is a block diagram illustrating metrics involved in value estimation, according to an embodiment of the invention

FIG. 2 depicts metrics involved in value estimation and their relationships. As shown in the solid box (201) in the middle of FIG. 2, we start by identifying the process context, for a given customer and product, by taking guidance from industry best practices such as ITIL or Control Objectives for Information and Related Technology (COBIT). Specifically, in this embodiment, we use IBM Tivoli Unified Process (ITUP) framework, an implementation of ITIL, that contains detailed process diagrams and descriptions (202 through 208) of IT Service Management processes. However, it is to be noted that our approach is independent to specific process framework and can be applied to any framework where the service management processes are clearly described.

Then, we use complexity analysis techniques to estimate the process baseline. As shown in the dashed box (209) in the upper right corner of FIG. 2, we quantify process baseline through both complexity metrics (210) and performance metrics (211). By exploring the hierarchical process structure defined in ITUP, we simplify the complexity analysis work and yet generate a baseline quantification that can be used to estimate process improvement.

Afterwards, we identify product capabilities to estimate the associated improvements. As shown by the dashed box (212) in the bottom right corner, we calculate performance improvement from three sources: baseline performance metrics such as execution time percentage (213), impacted complexity (214) that reflects the impact from the evaluated product, and customized complexity (215) that reflects the difference between the ITUP baseline process and the actual process used by customers.

Finally, we evaluate use cases to estimate the impact of the process investment (216).

Figure 3:
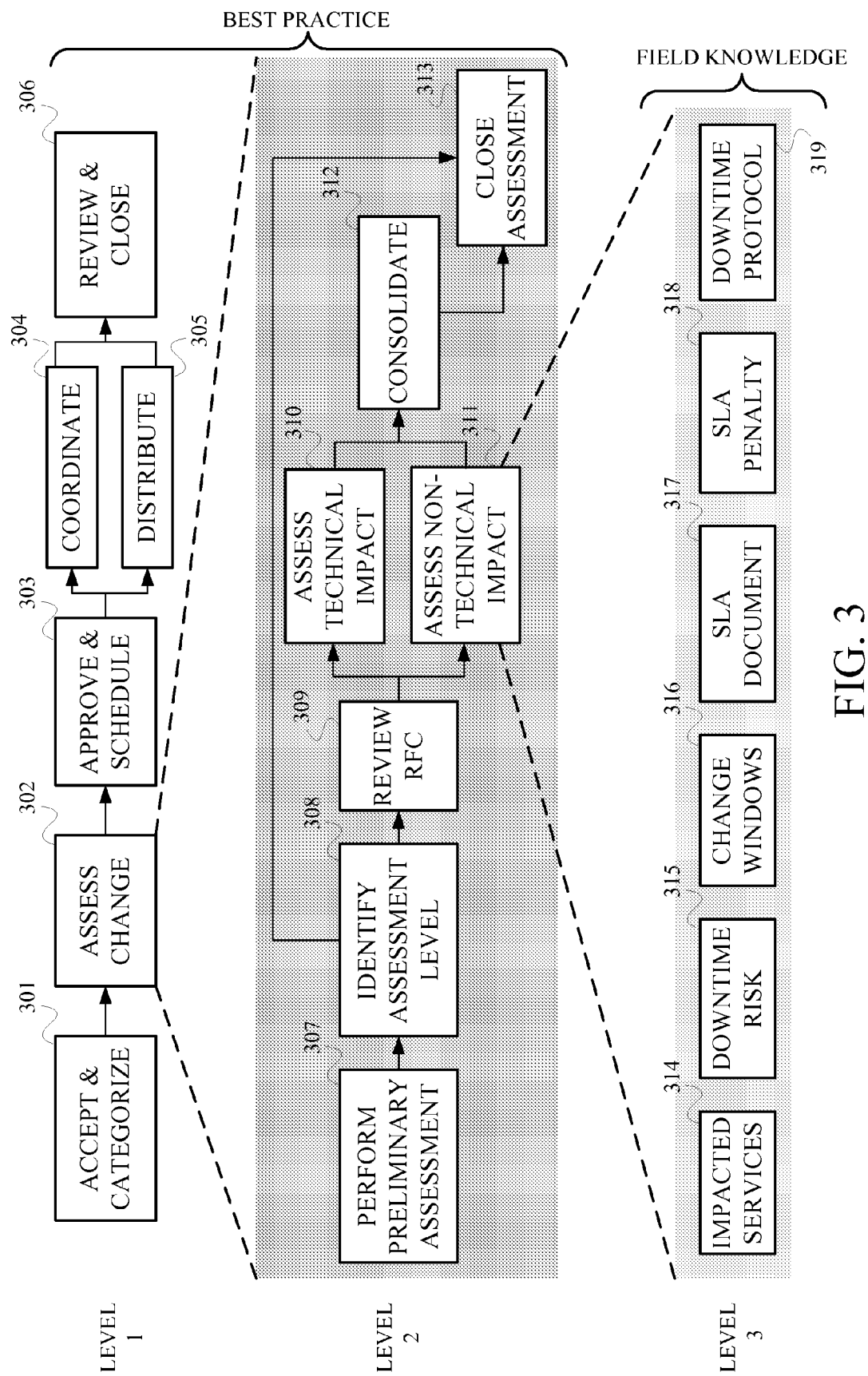
FIG. 3 is a block diagram illustrating process context identification, according to an embodiment of the invention.

FIG. 3 is a block diagram illustrating process context identification. In the interest of providing quantitative process analysis that reveals gains from new service product, we apply a hybrid approach that identifies the process context. At the high level, we use ITUP to represent the overall structure of a process. Although the actual process used by the service provider may be different to the ITUP process and some service providers may not have their processes explicitly modeled, using ITUP as a high level best practice still allows us to reason about the service provider processes in a consistent manner. Furthermore, at the low level, we resort to technical consultants who have worked for many years in the IT service management field to fill up the knowledge that matters for actual process implementation. Specifically, we collect a set of key questions that need to be answered in order to complete the tasks in the ITUP process. These questions are still in the generic sense and applicable to different service providers, but the way that they are being answered depends on the service provider's specific environment and the type of tools and service products being used.

We illustrate the above discussion using a change management process as shown in FIG. 3. The first two levels of abstractions are provided in ITUP as best practices for the change management process.

Level 1 shows the overall change management process composed of six subprocesses. Subprocess Accept and Categorize Change (301) begins with the creation of a Request for Change (RFC) followed by classifying the RFCs as Standard Change or Exception Change. Subprocess Assess Change (302) analyzes each RFC to determine its impact on existing and planned configuration items as well as the impact on resources required to build and deploy the change. Subprocess Approve and Schedule Change (303) represents a decision checkpoint against the RFC, based on impact, which examines the analysis results from Assess Change and determines whether to approve the RFC. Subprocess Coordinate the Implementation (304) ensures that changes are implemented as scheduled. Subprocess Prepare, Distribute and Implement the Change (305) carries out the technical work to package up an accepted solution for the change. Subprocess Review and Close Change (306) determines whether any follow-up action is required and updates other process areas of the status of the Change.

On level 2, we illustrate the breakdown of the assess change subprocess (note that, in the interest of space, the breakdowns for other subprocesses are omitted here). Task Perform Preliminary Assessment (307) identifies the appropriate change model for handling the RFC. Task Identify Assessment Level (308) allocates a priority level for the RFC. Task Review RFC (309) makes RFCs available for assessment. Task Assess for Technical Impact (310) evaluates the impact of an RFC from the IT perspectives. Task Assess for Non-Technical Impact (311) evaluates the impact of an RFC from the non-technical (e.g., enterprise) perspectives. Task Consolidate Change Assessment Results and Issues (312) ensures that the RFC can be successfully implemented with a minimal impact to committed services and still meet requirements. Task Close Assessment (313) makes recommendations, including requests for further assessment.

On level 3, we illustrate six typical questions to be answered by the assess impact task. These questions represent the field knowledge from experience technical consultants. Question (314) asks what is the service(s) impacted by this change. Question (315) asks what is the risk of the service not being available. Question (316) asks what are the predefined change windows for service changes. Question (317) asks whether there is a service level agreement (SLA) for the service. Question (318) asks whether there are penalties for not achieving the SLA. Question (319) asks whether the support personnel have been communicated with, and do they know what to do in the event of a problem with the change.

Through this approach, we structure the IT operations so that they can be mapped to generic ITUP processes, as well as provide sufficient details to eventually reason about product-driven improvements. This structured analysis provides the basis for our methodology to focus on the key aspects in a process and start the complexity analysis to establish the process baseline. Without such a structure, a consultant can still conduct a level 3 analysis, but is more likely to either involve trivial details or overlook important aspects.

Figures 4, 4A:
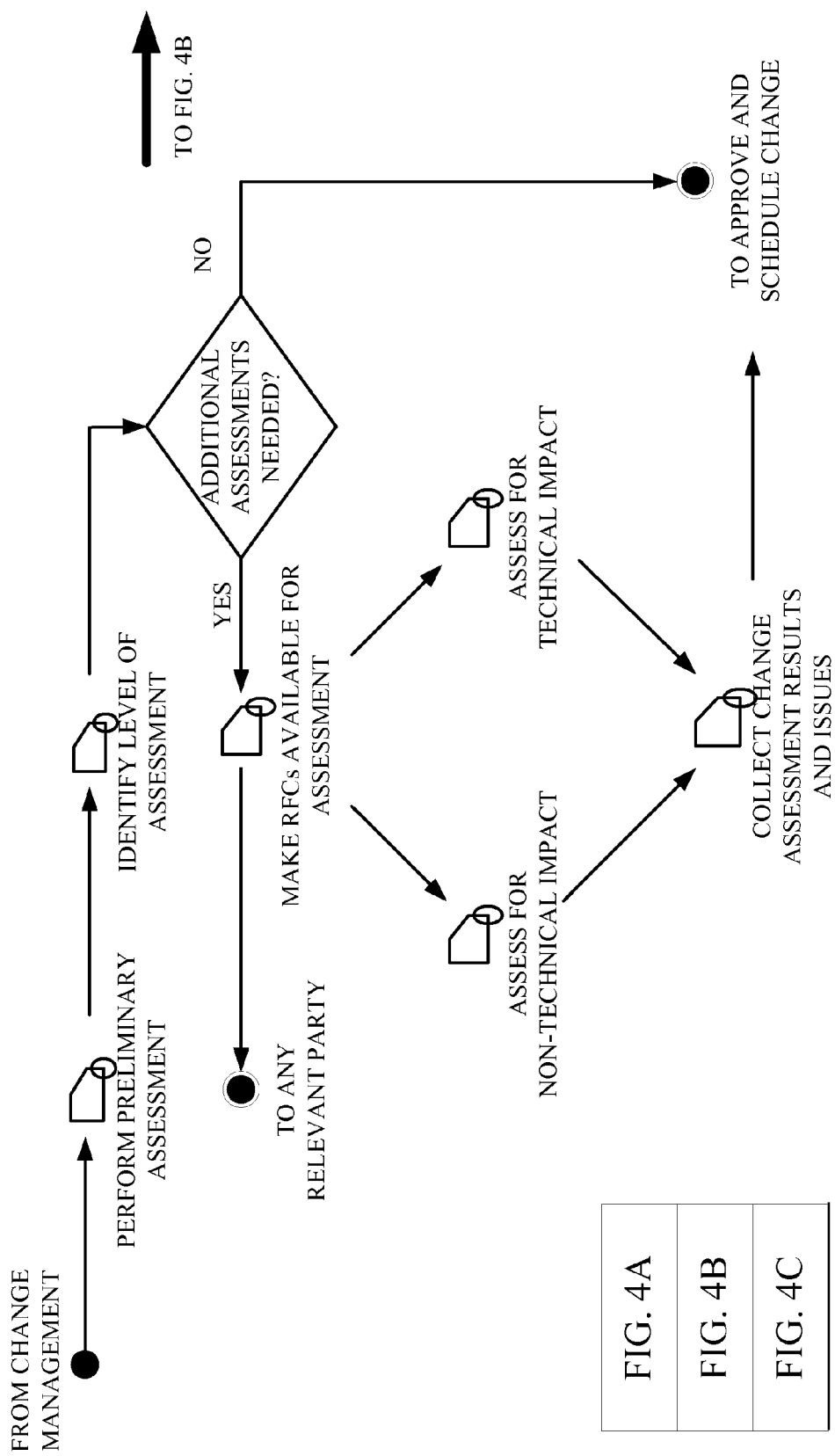
FIG. 4 is an illustration for process baseline quantification using complexity analysis techniques, according to an embodiment of the invention.

FIG. 4 is an illustration for process baseline quantification using complexity analysis techniques. We quantify the process context identified above using complexity analysis techniques. Specifically, we aim to establish a quantitative baseline to be used as a basis to evaluate process improvement. By baseline, we mean a typical walk-through of the process using common practice and prevailing tools that are generally used by most service providers.

Given the scope of the process and associated complexity of executing each task, a complete complexity analysis can be a fairly involved process. We mitigate the "complexity" of conducting complexity analysis by focusing on the most important problem points in the process. This helps to optimally utilize the limited amount of time working with subject matter experts. The mitigation is achieved through the following two mechanisms.

First, we explore the hierarchical process structure defined in ITUP and decide on which part of the process (i.e., sub-processes, tasks) one has to conduct the complexity analysis. We achieve this prioritization by looking at performance metrics, such as execution time and error rate, which are closer to user interest and value. Typically, we use execution time for the sake of simplicity, considering both the efforts required to get the data and the accuracy of the acquired data. Compared to other performance metrics, execution time is the easiest metric that is either recorded or can be estimated by technical consultants with less extra effort. Furthermore, we capture the execution time as a percentage relative to the overall turn-around time. This not only makes the estimation easier (compared to asking for the exact time which can be different for different service environment and different service request volume), but naturally presents the problem points on which we want to focus complexity analysis and reveal process improvement.

Second, when we conduct complexity analysis, we focus on information source complexity (and omit other types of complexity) if the sake of process evaluation time is of concern. As illustrated in FIG. 3, we assess the complexity of supplying the answers to the six questions listed on level 3, corresponding to the assess impact task. This is consistent with our experience that information complexity typically is the largest opportunity for improvement.

For example, in the change management process shown in FIG. 4, we find from Subject Matter Experts (SMEs) that the Assess Change subprocess takes about 35% of the overall turn-around time, and the Assess Non-Technical Impact task takes about 35% of the overall execution time for the Assess Change subprocess. This implies the Assess Non-Technical Impact task as a problem point, and we can consequently conduct complexity analysis to find out more about this task. When we conduct complexity analysis, we focus on information source complexity (and omit other types of complexity) if the sake of process evaluation time is of concern. We assess the complexity of supplying the answers to the six questions listed on level 3, corresponding to the Assess Non-Technical Impact task. This is consistent with our experience that information complexity typically is the largest opportunity for improvement.

Figure 5:
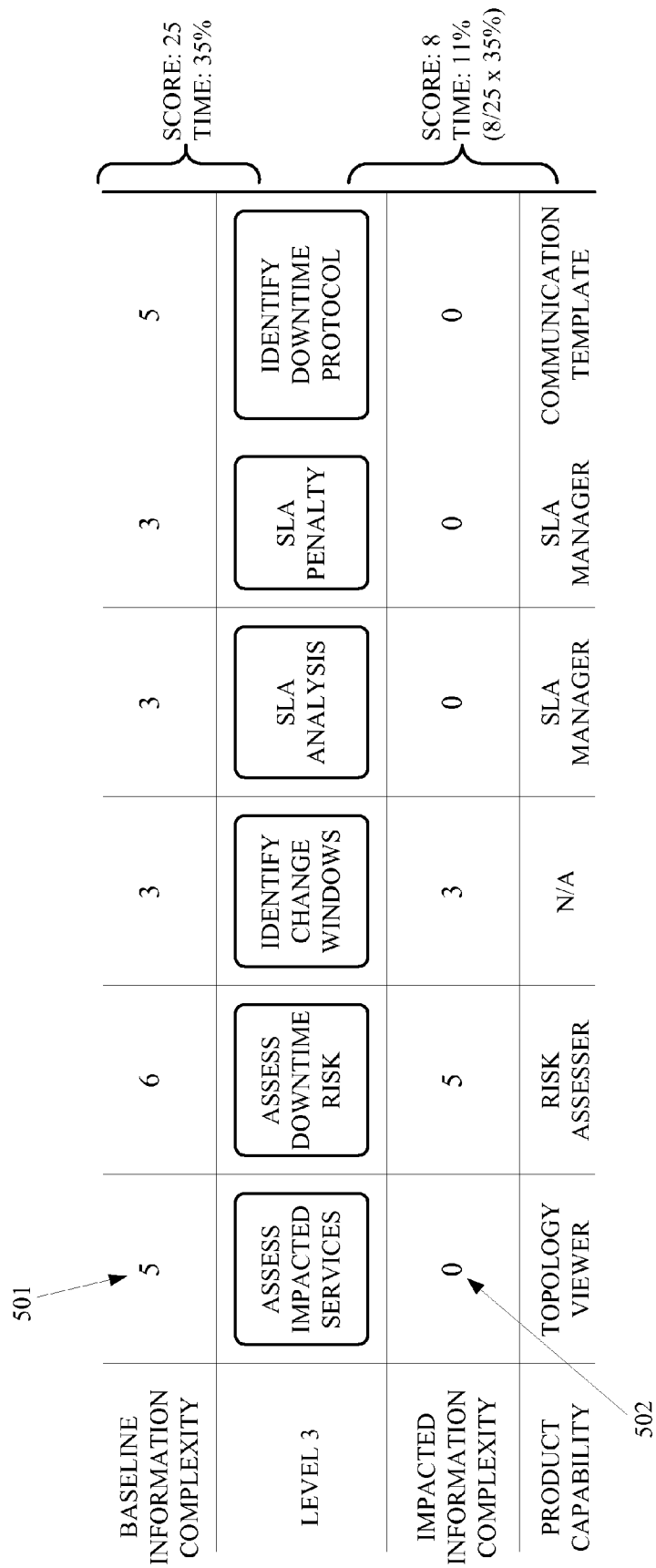
FIG. 5 is a block diagram illustrating product capability mapping and process improvement estimation, according to an embodiment of the invention.

FIG. 5 is a block diagram illustrating product capability mapping and process improvement estimation. We go through the tasks identified in the previous steps, and study how the evaluated product can affect the task complexity and which functionality contributes to this impact. This step is typically carried out through collaboration with the SMEs who are knowledgeable in actual benefit of product capabilities.

For example, consider the Assess Impact task in a change management process. As shown in FIG. 5, estimating product impact is conducted by comparing the (previously assessed) scores for the baseline information complexity and the impacted complexity scores due to the introduction of a product capability. FIG. 5 illustrates complexity analysis for the six level 3 questions from the Assess Impact task. The first question is what are the services impacted by the change. For example, network router firmware will be updated and the service personnel need to find out the dependencies between the network router and related applications. We assign an information complexity score of [5], environmentFixed, to the baseline (501). This reflects the situation that the impacted services depend on the specific service delivery environment.

Suppose we are evaluating a change management product which has a capability to show the change dependencies through a topology viewer. This will significantly reduce the complexity of answering this question, since the impacted services are known from this topology viewer. Thus, the information complexity is reduced to [0], internal, as the information is automatically provided by this service product and no manual work is further required.

Next, we estimate performance improvement. Although we can still use the regression model to correlate execution time with complexity metrics, this requires both a large set of measured execution time and collecting all complexity metrics, which may be time-consuming to obtain. But note that if the situation permits, taking this regression modeling approach will yield more accurate performance improvement estimation. Instead, we propose a simplified model by assuming the performance-related savings is proportional to information complexity reduction. That is, if there is x % of information complexity reduction, the performance-related savings is x % as well.

Finally, we conduct value estimation. We consider several cases for value estimation. The simplest one is labor cost reduction. This is directly linked with the execution time reduction. For example, as illustrated in FIG. 5, assume a change management product reduces the execution time for the Assess Impact task from 35% to 11%, a reduction of 24%. The labor cost reduction can be calculated by further knowing the overall time that a service personnel needs to work in a change management process and the relevant service personnel salary information.

Furthermore, by viewing complexity reduction as the fundamental reason for process improvement, we can apply our value estimation methodology to other cases such as service fulfillment savings and service quality improvement. Note that by savings in service execution time, it not only saves the labor cost of delivering the services, but reduces the service fulfillment time for the customers. This can be converted to financial impact on avoiding service agreement violation and getting incentives for completing the services earlier.

In addition, we extrapolate process improvement to evaluate service quality improvement. Consider that reducing task complexity also has the benefits of reducing the error rate, for example, the number of incidents caused by improperly handled change requests. By assuming a linear relationship between complexity reduction and incident reduction, we have a first order estimation on the value from service quality improvement.

By way of further example, consider a case where the service provider is interested in deploying a new application discovery tool to help improve the efficiency of its change management process and reduce the corresponding labor cost. First, the service provider needs to obtain the baseline. For example, it is found that its change management process requires five full time equivalents (FTE) per year. Suppose as calculated above, the application discovery tool has a 10% performance related saving. This gives a 0.5 FTE reduction. Assume the FTE salary is $100,000 per year, the financial case will be $50,000 savings.

Figure 6:
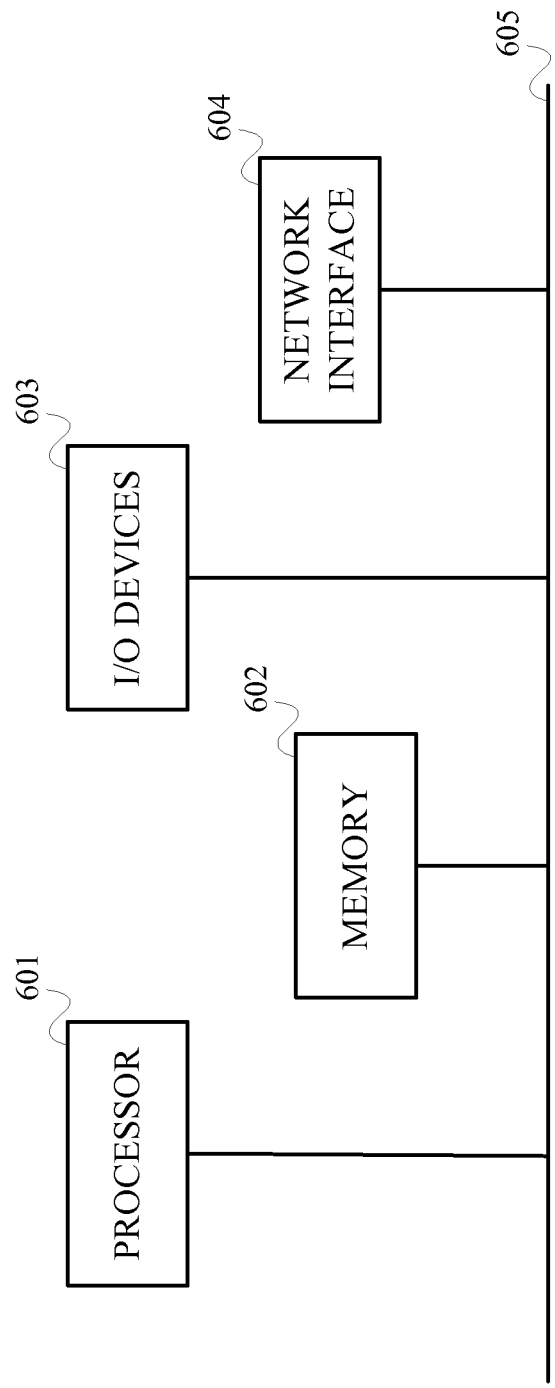
FIG. 6 is a block diagram illustrating a computing system in accordance with which one or more components/steps of a value estimation system may be implemented, according to an embodiment of the invention.

FIG. 6 illustrates a computing system in accordance with which one or more components/steps of the value estimation techniques (e.g., components and methodologies described in the context of FIGS. 1 through 5) may be implemented, according to an embodiment of the present invention. It is to be understood that the individual components/steps may be implemented on one such computing system or on more than one such computing system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 6 may represent one or more servers or one or more other processing devices capable of providing all or portions of the functions described herein.

As shown, the computing system architecture may comprise a processor 601, a memory 602, I/O devices 603, and a network interface 604, coupled via a computer bus 605 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Each such example of a memory may be considered a "computer readable storage medium."

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:

deploying and executing an improved enterprise management process of an enterprise management computer product on one or more computer nodes of a computer network;

executing a computerized process to analyze and collect information regarding the execution of the improved enterprise management process on the one or more computer nodes of the computer network and estimate a value of the improved enterprise management process of the enterprise management computer product, wherein the estimated value comprises an indicator of reduction in a task complexity of the improved enterprise management process, wherein the computerized process comprises:
identifying a process context for the improved enterprise management process under which the enterprise management computer product is to be evaluated, wherein identifying the process context comprises (i) identifying one or more tasks that make up the improved enterprise management process and (ii) mapping the one or more tasks to standard tasks and a hierarchical process structure, winch are defined by a knowledge base of standard management processes;
generating the process context as a data structure which includes the standard tasks that are mapped to the one or more tasks of the improved enterprise management process based on said mapping and said hierarchical process structure;
quantifying a process baseline for the improved enterprise management process based on the tasks included in said generated process context, wherein the process baseline is quantified using at least one key performance metric and at least one complexity metric for the tasks included in said generated process context,
wherein quantifying the process baseline comprises quantifying the process context using a complexity analysis process framework which estimates a complexity with regard to performing the tasks included in said generated process context that make up the hierarchical process structure representative of the improved enterprise management process executing on the one or more computer nodes of the computer network, wherein the complexity analysis process framework determines an execution time for each of the tasks included in said generated process context as a percentage of an overall turn-around time of the improved enterprise management process executing on the one or more computer nodes of the computer network, and limits the complexity analysis to those tasks with execution times that are deemed to take a significant amount of time of the overall turn-around time;
utilizing the process baseline to determine an improvement measure for the improved enterprise management process, wherein the improvement measure is achieved based on the deployment of the improved enterprise management process; and
utilizing information generated from the process context, the process baseline, and the improvement measure to generate said estimated value which comprises the indicator of the reduction in a task complexity of the improved enterprise management process of the enterprise management computer product; and
outputting the estimated value for assessment of process improvement of the improved enterprise management process executing on the one or more computer nodes of the computer network,
wherein the computer comprises a memory and a processor device operatively coupled to the memory and configured to perform the computerized process.

2. The method of claim 1, wherein the process context identities a set of service management processes which can be impacted by the tooling deployment or the process transformation.

3. The method of claim 1, wherein the complexity analysis process framework is multi-dimensional, wherein dimensions of the complexity analysis process framework include an execution complexity dimension, a coordination complexity dimension, and an information complexity dimension.

4. The method of claim 3, wherein the execution complexity dimension represents a complexity with regard to performing the one or more tasks that make up the enterprise management process characterized by the number of tasks, the number of roles associated with a task, and an amount of automation.

5. The method of claim 3, wherein the coordination complexity dimension represents a complexity resulting from coordinating between multiple roles within a task or coordinating between multiple roles between tasks.

6. The method of claim 3, wherein the information complexity dimension represents a complexity with regard to providing data into the enterprise management process.

7. The method of claim 1, wherein the improvement measure is computed from a baseline performance metric.

8. The method of claim 7, wherein the baseline performance metric comprises an execution time percentage of the one or more tasks.

9. The method of claim 1, wherein the improvement measure is computed from an impacted complexity metric.

10. The method of claim 9, wherein the impacted complexity metric comprises a measure of an impact from the tooling deployment or the process transformation.

11. The method of claim 1, wherein the step of estimating said value for the enterprise management process further comprises evaluating one or more use cases to estimate the impact of the improvement.

12. The method of claim 1, wherein the enterprise management process comprises an information technology service process.

13. Apparatus comprising:
a memory configured to store program instructions; and
a processor operatively coupled to the memory and configured to execute the program instruction to:
deploy and execute an improved enterprise management process of an enterprise management computer product on one or more computer nodes of a computer network; and
execute a computerized process to analyze and collect information regarding the execution of the improved enterprise management process on the one or more computer nodes of the computer network and estimate a value of the improved enterprise management process of an enterprise management computer product, wherein the estimated value comprises an indicator of reduction in a task complexity of the improved enterprise management process, wherein the computerized process comprises:
identifying a process context for the improved enterprise management process under which the enterprise management computer product is to be evaluated, wherein identifying the process context comprises (i) identifying one or more tasks that make up the improved enterprise management process and (ii) mapping the one or more tasks to standard tasks and a hierarchical process structure, which are defined by a knowledge base of standard management processes;
generating the process context as a data structure which includes the standard tasks that are mapped to the one or more tasks of the improved enterprise management process based on said mapping and said hierarchical process structure;

quantifying a process baseline for the improved enterprise management process based on the tasks included in said generated process context, wherein the process baseline is quantified using at least one key performance metric and at least one complexity metric for the tasks included in said generated process context, wherein quantifying the process baseline comprises quantifying the process context using a complexity analysis process framework which estimates a complexity with regard to performing the tasks included in said generated process context that make up the hierarchical process structure representative of the improved enterprise management process executing on the one or more computer nodes of the computer network, wherein the complexity analysis process framework determines an execution time for each of the tasks included in said generated process context as a percentage of an overall turn-around time of the improved enterprise management process executing on the one or more computer nodes of the computer network, and limits the complexity analysis to those tasks with execution times that are deemed to take a significant amount of time of the overall turn-around time;

utilizing the process baseline to determine an improvement measure for the improved enterprise management process, wherein the improvement measure is achieved based on the deployment of the improved enterprise management process; and utilizing information generated from the process context, the process baseline, and the improvement measure to generate said estimated value which comprises the indicator of the reduction in a task complexity of the improved enterprise management process of the enterprise management computer product; and outputting the estimated value for assessment of process improvement of the improved enterprise management process executing on the one or more computer nodes of the computer network.

14. The apparatus of claim 13, wherein the process context identifies a set of service management processes which can be impacted by the tooling deployment or the process transformation.

15. The apparatus of claim 13, wherein the complexity analysis process framework is multi-dimensional, wherein dimensions of the complexity analysis process framework include an execution complexity dimension, a coordination complexity dimension, and an information complexity dimension.

16. The apparatus of claim 13, wherein estimating said value for the enterprise management process further comprises evaluating one or more use cases to estimate the impact of the improvement.

17. An article of manufacture comprising a non-transitory computer readable storage medium including one or more programs which when executed by a computer system perform the steps of:

deploying and executing an improved enterprise management process of an enterprise management computer product on one or more computer nodes of a computer network;

executing a computerized process to analyze and collect information regarding the execution of the improved enterprise management process on the one or more computer nodes of the computer network and estimate a value of the unproved enterprise management process of the enterprise management computer product, wherein the estimated value comprises an indicator of reduction in a task complexity of the improved enterprise management process, wherein the computerized process comprises:

identifying a process context for the improved enterprise management process under which the enterprise management computer product is to be evaluated, wherein identifying the process context comprises (i) identifying one or more tasks that make up the improved, enterprise management process and (ii) mapping the one or more tasks to standard tasks and a hierarchical process structure, which are defined by a knowledge base of standard management processes;

generating the process context as a data structure which includes the standard tasks that are mapped to the one or more tasks of the improved enterprise management process based on said mapping and said hierarchical process structure;

quantifying a process baseline for the improved enterprise management process based on the tasks included in said generated process context, wherein the process baseline is quantified using at least one key performance metric and at least one complexity metric for the tasks included in said generated process context, wherein quantifying the process baseline comprises quantifying the process context using a complexity analysis process framework which estimates a complexity with regard to performing the tasks included in said generated process context that make up the hierarchical process structure representative of the improved enterprise management process executing on the one or more computer nodes of the computer network, wherein the complexity analysis process framework determines an execution time for each of the tasks included in said generated process context as a percentage of an overall turn-around time of the improved enterprise management process executing on the one or more computer nodes of the computer network, and limits the complexity analysis to those tasks with execution times that are deemed to take a significant amount of time of the overall turn-around time;

utilizing the process baseline to determine an improvement measure for the improved enterprise management process, wherein the improvement measure is achieved based on the deployment of the improved enterprise management process; and utilizing information generated from the process context, the process baseline, and the improvement measure to generate said estimated value which comprises the indicator of the reduction in a task complexity of the improved enterprise management process of the enterprise management computer product; and outputting the estimated value for assessment of process improvement of the improved enterprise management process executing on the one or more computer nodes of the computer network.

* * * * *